US00RE35245E

United States Patent [19]

Donsky

[11] E Patent Number: Re. 35,245

[45] Reissued Date of Patent: May 21, 1996

[54] NOVELTY UPPER TORSO GARMENT

[76] Inventor: Lawrence Donsky, 10 Shiloh Rd., Englishtown, N.J. 07726

[21] Appl. No.: 584,998

[22] Filed: Sep. 19, 1990

Related U.S. Patent Documents

Reissue of:

[64] Patent No.: 4,772,503
Issued: Sep. 20, 1988
Appl. No.: 71,920
Filed: Jul. 10, 1987

[51] Int. Cl.[6] ..... B44C 1/18

[52] U.S. Cl. ..... 428/79; 2/115; D2/856; 428/16

[58] Field of Search ..... D2/81, 856; 2/115; 156/61; 428/16, 79, 542.2

[56] References Cited

U.S. PATENT DOCUMENTS

| | | | |
|---|---|---|---|
| 2,859,152 | 11/1958 | Markus et al. | 428/79 X |
| 4,591,521 | 5/1986 | Freno et al. | 428/16 X |
| 4,631,210 | 12/1986 | McGee et al. | 428/79 X |
| 4,772,503 | 9/1988 | Donsky | 428/79 |

*Primary Examiner*—Henry F. Epstein

[57] ABSTRACT

A molded [rubber] object attached as decoration to a Tee-shirt or like garment, the attachment being confined to the shoulder for proper support and balance, and without internal object-supporting pads necessary to hold the shape of the decorative object.

7 Claims, 1 Drawing Sheet

NOVELTY UPPER TORSO GARMENT

Matter enclosed in heavy brackets [ ] appears in the original patent but forms no part of this reissue specification; matter printed in italics indicates the additions made by reissue.

*This application is a reissue of application Ser. No. 07/071,920 filed Jul. 10, 1987 and now U.S. Pat. No. 4,772,503 issued on Sep. 20, 1988.*

The present invention relates generally to Tee-shirts or the like with three-dimensional decoration thereon, and more particularly to improvements in affixing said type of decoration without causing any discomfort in the wearing of the garment.

Decorated Tee-shirts or like garments are, of course, well known, and include even three-dimensional decorative objects, as exemplified by the decorated Tee-shirt of the Freno et al. U.S. Pat. No. 4,591,521 issued on May 27, 1986. To hold the decorative object in a three-dimensional shape use is made of a foam pad or its equivalent, which even though lightweight, still adds some discomfort during garment wear.

Broadly, it is an object of the present invention to provide a Tee-shirt decorated with a three-dimensional object without detracting from comfort, and otherwise overcoming the foregoing and other shortcomings of the prior art. More particularly, it is an object to provide a decorated Tee-shirt without decoration-supporting pads, and wherein the wearer, by advantageous positioning of the decoration, provides the necessary underlying support for same.

A decorated garment demonstrating objects and advantages of the present invention contemplates as the garment component one that has a body fitting over the upper torso of the wearer and of the type having a neck opening, right and left sleeves, and portions of said body extending from said neck opening to said fight and left sleeves in overlying relation to the shoulders of said wearer. The other component is a molded decorative object of elastomeric construction material having an outer, upper decorative surface and side walls in depending relation therefrom terminating in a peripheral edge bounding an opening into a hollow compartment formed beneath the underside of the upper decorative surface and between the depending side walls. In practice, the elastomeric construction material of the depending side walls is of sufficient strength to support the upper decorative surface from collapse into the compartment, and attachment of the decorative object, without any supporting pads in the compartment, is made to the garment at a location confined to the shoulder-overlying portion of the garment body. As a result, the essentially horizontally oriented shoulder of the wearer serves as a support surface for the decorative object, which decorative object further is maintained in a clearance position therefrom by the side walls and without, as already noted, any supporting pads within the compartment.

Figure 2:
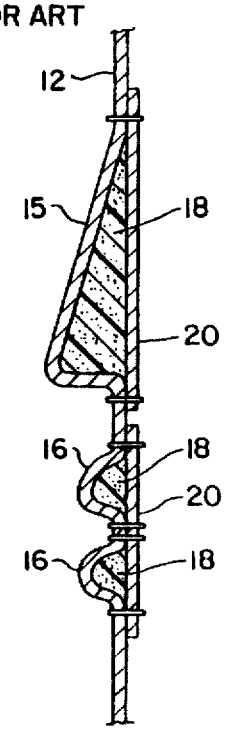
FIG.2 PRIOR ART
FIG. 2 is a side view projected from FIG. 1 taken along line 2—2, showing further details of the prior art.

In the prior art, as exemplified by prior U.S. Pat. No. 4,591,521, decorative objects, of a three-dimensional nature, such as a design comprising eyes 14, nose 13 and upper and lower lips 16, were appropriately attached to a front panel 12 of a Tee-shirt 13, and, as best illustrated in FIG. 2, were maintained in a three dimensional configuration by appropriately shaped foam pads 18 disposed in an interposed position between the portions or the Tee-shirt front panel 12 which are formed into the previously noted shapes 15 and 16, and rear panels 20. In the prior art, three-dimensional decoration attached as just described to the Tee-shirt 13 thus requires some internal support to maintain its three-dimensional configuration, such as the foam pads 18, and this adds to the weight of the garment, tends to cause shifting movement in the garment relative to the wearer's upper torso, and in other respects contributes to discomfort.

Figure 3:
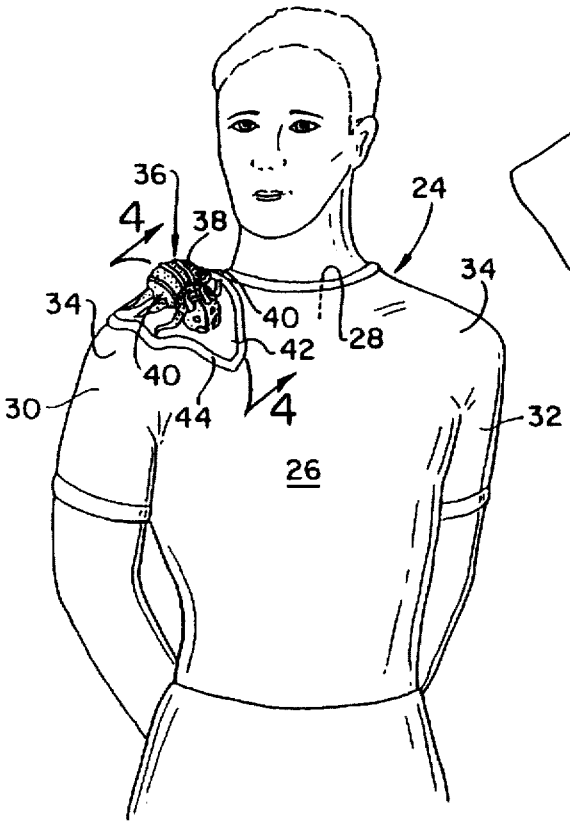
FIG. 3 is a perspective front view of a Tee-shirt or other upper torso garment illustrating the special location and means of attaching a decorative object thereto an accordance with the present invention.
Figure 1:
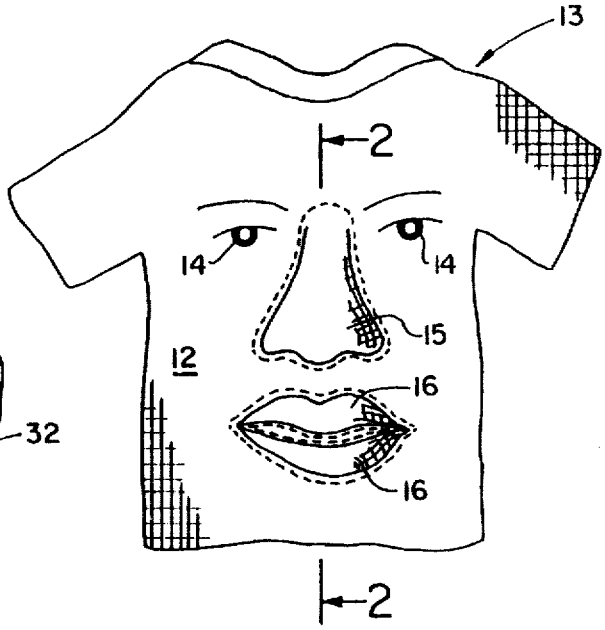
FIG.1 PRIOR ART
FIG. 1 is a front view of a Tee-shirt having a three-dimensional decorative object applied to the front panel thereof, and exemplifies the prior art.
Figure 4:
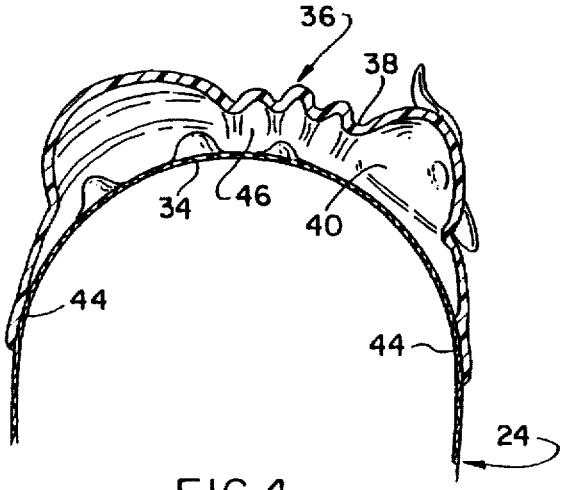
FIG. 4 is a sectional view, on an enlarged scale, taken along line 4—4 of FIG. 3, showing further structural details and aspects of the within invention.

Overcoming the aforesaid and other shortcomings of the prior art, attachment of a three-dimensional decorative object to a Tee-shirt or other upper torso garment according to the present invention is illustrated in FIG. 3 and 4, which will now be described. The Tee-shirt 24 or similar upper torso garment has a body 26 and is of the type having a neck opening 28, right and left sleeves 30 and 32, and body portions extending from the neck opening 28 to the sleeves 30 and 32 which overlie the shoulders of the wearer and are herein specifically designated 34. For purposes of explaining the invention, the decorative object which forms the other part of the inventive combination will be described as attached to the fight shoulder portion 34, but, of course, it will be understood that it could be attached also to the left portion, and that even two decorative objects could be attached, each to the left and fight shoulder portion 34, respectively.

From the aforesaid it should be understood that a part of the invention is a specific selection of the shoulder portion 34 of the garment 24 for the attachment of the decorative object. As shown in FIGS. 3 and 4, the decorative object, generally designated 36, is a facsimile of a cricket, but, of course, it will be understood that other insects or object shapes can be utilized. One of the aspects of the object selected which contributes to the invention, however, is that the decorative object 36 is a molded article of manufacture, preferably of elastomer construction material. Its construction contemplates an upper decorative surface 38, and side walls 40 dependent therefrom which are in a full 360° encircling relation about the upper surface 38, and finally a lip portion 42, which graphically could simulate the "ground" on which the "cricket" is perched. When a lip portion is provided, it is understood that it can be omitted and the decorative object may consist merely of the upper surface 38 and dependent sidewall 40. The lip portion 42 is provided with a peripheral edge 44, otherwise the sidewall 40 is provided with the peripheral edge 44.

As is perhaps best illustrated in FIG. 4, to which reference should now be made, it will be understood that the upper decorative surface 38 and the dependent side wall 40, by virtue of terminating in the peripheral edge 44, provide a construction in which the edge 44 bounds an opening into an internal compartment 46, which is formed beneath the upper decorative surface 38 and between the sidewall 40. Stated another way, the compartment 46 is the hollowness of the decorative object 36. Still referring to FIG. 4, in practice, the decorative object 36 is attached along the attaching peripheral edge 44 using, in the illustrated embodiment, an appropriate adhesive, but also can be attached by heat sealing or by stitching.

Contributing to the present invention is the specific selection and the confinement of the location at which the decorative object 36 is attached to the Tee-shirt 24 to the shoulder area 34, since the shoulder of the wearer presents an essentially horizontally oriented support surface for the decorative object 36. This is in contrast to the prior art in which the upper torso or body of the wearer does not significantly contribute to supporting the decorative object, but rather the support is entirely provided by the attachment to the Tee-shirt.

Also, and as is illustrated in the embodiment of FIG. 4, the "cricket" decorative object 36 is greater in its lengthwise dimension than in its widthwise dimension, and as a result, the object is oriented lengthwise in a condition which straddles the curvature of the shoulder of the wearer. Thus, as clearly shown in FIG. 4, the elastomeric or rubber decorative object 36 assumes the curvature of the shoulder and as a result also assumes a desirable position of balance on the shoulder.

It should also be noticed in FIG. 4 that one of the requirements of the invention is attachment of the decorative object 36 to the Tee-shirt 24 without any internal supporting means within the compartment 46, such as the prior art foam pad 18. Instead, the decorative surface 38 is held in a clearance position about the shoulder portion 34 by the strength in the elastomeric side walls 40, but these side walls nevertheless are sufficiently resilient so that if there is any pressure applied externally to the object 36, the upper surface 34 can temporarily be displaced upwardly or downwardly and thus into or out of the compartment 46. This would occur, of of course, when the wearer places a jacket over the Tee-shirt or garment 24, or at other times during normal use when the decorative object 36 may be touched, brushed against, or the like. The absence of any padding, of course, contributes to the comfort in wearing the garment with attached decorative objects, since it maintains the lightweight nature thereof.

A latitude of modification, change, and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. As an article of manufacture, the combination of a garment having a body fitting over the upper torso of the wearer and of the type having a neck opening, right and left sleeves, and portions of said body extending from said neck opening to said right and left sleeves in overlying relation to the shoulders of said wearer, and a molded decorative object of elastomeric construction material having an outer, upper decorative surface and side walls in depending relation therefrom terminating in a peripheral edge bounding an opening into a hollow compartment formed beneath the underside of said upper decorative surface and between said depending side walls, said elastomeric construction material of said depending side walls being of sufficient strength to support said upper decorative surface from collapse into said compartment, and attachment means for securing said peripheral edge of said decorative object without any supporting means in said compartment at a location confined to the shoulder-overlying portion of said garment body, whereby the essentially horizontally oriented shoulder of the wearer serves as a support surface for said decorative object which further is maintained in a clearance position therefrom by said side walls and without any supporting means within said compartment.

2. The article of manufacture as claimed in claim 1, wherein said peripheral edge is adhesively secured to said garment.

3. The article of manufacture as claimed in claim 1, wherein said decorative object is larger in its lengthwise than in its widthwise dimension, and said object is oriented lengthwise in a condition straddling the curvature of the shoulder of said wearer in its attached position to said garment, whereby said object assumes the shape of said shoulder and therefore a position of balance thereon.

4. The article of manufacture as claimed in claim 1, wherein said construction material of said decorative object side walls which supports said upper decorative surface is also sufficiently resilient to permit the temporary up and down movement in response to pushing forces of said upper decorative surface into and out of said compartment, without said pushing forces causing discomfort to the wearer.

*5. As an article of manufacture, the combination of a garment having a body fitting over the upper torso of the wearer and of the type having a neck opening, right and left sleeves, and portions of said body extending from said neck opening to said right and left sleeves in overlying relation to the shoulders of said wearer, and a molded decorative object having an outer, upper decorative surface and side walls in depending relation therefrom terminating in a peripheral edge bounding an opening into a hollow compartment formed beneath the underside of said upper decorative surface and between said depending side walls, said side walls being of sufficient strength to support said upper decorative surface from collapse into said compartment, and attachment means for securing said peripheral edge of said decorative object without any supporting means in said compartment at a location confined to the shoulder-overlying portion of said garment body, whereby the essentially horizontally oriented shoulder of the wearer serves as a support surface for said decorative object which further is maintained in a clearance position therefrom by said side walls and without any supporting means within said compartment.*

*6. The article of manufacture as claimed in claim 5, wherein said peripheral edge is adhesively secured to said garment.*

*7. The article of manufacture as claimed in claim 5, wherein said decorative object is larger in its lengthwise than in its widthwise dimension, and said object is oriented lengthwise in a condition straddling the curvature of the shoulder of said wearer in its attached position to said garment, whereby said object assumes the shape of said shoulder and therefore a position of balance thereon.*

* * * * *